United States Patent
Chen et al.

(10) Patent No.: US 10,338,615 B2
(45) Date of Patent: Jul. 2, 2019

(54) CURRENT BALANCE CIRCUIT AND MULTIPHASE CONVERTER USING THE SAME

(71) Applicant: ANPEC ELECTRONICS CORPORATION, Hsinchu (TW)

(72) Inventors: Chih-Yuan Chen, Hsinchu (TW); Tzu-Yang Yen, Taipei (TW)

(73) Assignee: ANPEC ELECTRONICS CORPORATION, Hsinchu (TW)

(*) Notice: Subject to any disclaimer, the term of this patent is extended or adjusted under 35 U.S.C. 154(b) by 105 days.

(21) Appl. No.: 15/643,931

(22) Filed: Jul. 7, 2017

(65) Prior Publication Data

US 2018/0321701 A1    Nov. 8, 2018

(30) Foreign Application Priority Data

May 5, 2017    (TW) .............................. 106115015 A

(51) Int. Cl.
| | | |
|---|---|---|
| *G05F 1/00* | (2006.01) | |
| *G01R 19/00* | (2006.01) | |
| *H02M 3/00* | (2006.01) | |
| *G05F 1/46* | (2006.01) | |

(52) U.S. Cl.
CPC .................................... *G05F 1/461* (2013.01)

(58) Field of Classification Search
CPC ..................................................... G05F 1/461
See application file for complete search history.

(56) References Cited

U.S. PATENT DOCUMENTS

| | | | | |
|---|---|---|---|---|
| 6,215,290 B1* | 4/2001 | Yang | ................... | H02M 3/1584 323/282 |
| 6,670,794 B1* | 12/2003 | Wang | .................. | H02M 3/1584 323/213 |
| 6,897,636 B2* | 5/2005 | Harris | ..................... | H02J 1/102 323/272 |
| 8,055,384 B2* | 11/2011 | Lien | ..................... | G05B 19/238 700/245 |
| 8,350,545 B2* | 1/2013 | Huang | ................ | H02M 3/1584 323/272 |
| 8,736,473 B2* | 5/2014 | Dijkmans | ............. | H03M 3/434 341/143 |

(Continued)

FOREIGN PATENT DOCUMENTS

TW        201126858 A1    8/2011

*Primary Examiner* — Kenneth B Wells
(74) *Attorney, Agent, or Firm* — Li & Cai Intellectual Property (USA) Office

(57) ABSTRACT

A current balance circuit is used in a multiphase converter, and the multiphase converter includes power stage circuits, the current balance circuit and a control circuit. The current balance circuit includes detection units, a calculation circuit and error amplifiers. Detection units obtain the output power information of their corresponding power stage circuits. After each error amplifier compares the obtained output power information with the average of all output power information, it amplifies differences between the output power information and the average of all output power information and converts the amplified differences to current information, such that the control circuit adjusts currents provided by the power stage circuits according to the current information from the error amplifiers to balance the currents provided by the power stage circuits.

13 Claims, 7 Drawing Sheets

(56) References Cited

U.S. PATENT DOCUMENTS 8,890,552 B2* 11/2014 Huang .............. H02M 3/33507
    280/735
8,957,660 B2* 2/2015 Chen .................... H02M 1/084
    323/272

* cited by examiner

CURRENT BALANCE CIRCUIT AND MULTIPHASE CONVERTER USING THE SAME

BACKGROUND OF THE INVENTION

1. Field of the Invention

The present disclosure relates to a current balance circuit and a multiphase converter using the same; in particular, to a current balance circuit that has an improved DCR (Direct Current Resistance; DCR) current detection circuit using an inductor and a multiphase converter using the same.

2. Description of Related Art

Referring to FIG. 1, a schematic diagram of a traditional DCR current detection circuit is shown. As shown in FIG. 1, a current-detecting resistor R is serially connected to a capacitor C, and the serially connected current-detecting resistor R and the capacitor C are connected to an inductor L in parallel. When the resistance of the current-detecting resistor R and the capacitance of the capacitor C are well adjusted such that the time constant of the current-detecting resistor R and the capacitor C matches with the time constant of the inductor L and a direct current resistor DCR of the inductor L, an inductor current IL flowing through the inductor L, which is the current information of the inductor L, can be detected by measuring the voltage of the capacitor C.

SUMMARY OF THE INVENTION

The present disclosure provides a current balance circuit used in a multiphase converter. The multiphase converter at least includes a plurality of power stage circuits, the current balance circuit and a control circuit. The power stage circuits are electrically connected to the current balance circuit, and the control circuit is electrically connected between the current balance circuit and the power stage circuits. The current balance circuit includes a plurality of detection units, a calculation circuit and a plurality of error amplifiers. Each detection unit and its corresponding power stage circuits are electrically connected to obtain output power information of the power stage circuit. The calculation circuit is electrically connected to the detection units to calculate an average of the output power information. A non-inverting input end of each error amplifier is electrically connected to the calculation circuit to receive the average of the output power information, an inverting input end of each error amplifier is electrically connected to each detection unit to receive the output power information, and an output end of each error amplifier is electrically connected to the control circuit. After each error amplifier compares the output power information with the average of the output power information, each error amplifier amplifies a difference between the output power information and the average of the output power information, and converts the amplified difference to current information such that the control circuit adjusts a current provided by each power stage circuit according to the current information from each error amplifier to balance the currents provided by the power stage circuits.

The present disclosure provides another current balance circuit used in a multiphase converter. The multiphase converter at least includes a first power stage circuit, a second power stage circuit, a third power stage circuit, the current balance circuit and a control circuit. The first power stage circuit, the second power stage circuit and the third power stage circuit are electrically connected to the current balance circuit through the control circuit. The current balance circuit includes a plurality of detection units and a plurality of error amplifiers. Each detection unit is correspondingly and electrically connected to the first power stage circuit, the second power stage circuit or the third power stage circuit to obtain output power information of the first power stage circuit, the second power stage circuit or the third power stage circuit. A non-inverting input end of each error amplifier is electrically connected to the detection unit corresponding to the first power stage circuit to obtain the output power information of the first power stage circuit. An inverting input end of each error amplifier is electrically connected to the detection unit corresponding to the second power stage circuit or the third power stage circuit to obtain the output power information of the second power stage circuit or the third power stage circuit. An output end of each error amplifier is electrically connected to the control circuit. The error amplifiers amplify a difference between the output power information of the second power stage circuit and the output power information of the first power stage circuit, and amplify a difference between the output power information of the third power stage circuit and the output power information of the first power stage circuit. Then, the error amplifiers convert the amplified differences to current information, such that the control circuit adjusts the currents provided by the first power stage circuit, the second power stage circuit and the third power stage circuit according the current information for balancing the currents provided by the first power stage circuit, the second power stage circuit and the third power stage circuit.

The present disclosure also provides a multiphase converter. The multiphase converter at least includes a plurality of power stage circuits, any one of the above described current balance circuits and a control circuit to balance the currents provided by all of the power stage circuits.

To sum up, the current balance circuit provided by the present disclosure balances currents provided by all power stage circuits in a multiphase converter by an improved DCR current detection circuit using an inductor. Compared with a general current balance circuit balancing currents provided by all power stage circuits in a multiphase converter by a traditional DCR current detection circuit, it is unnecessary for the current balance circuit provided by the present disclosure to measure the actual voltages provided by the power stage circuits to a load for balancing the currents provided by all power stage circuits. Instead, only according to the voltage differences among the voltages provided by the power stage circuits, the current balance circuit provided by the present disclosure can adjust the current provided by each power stage circuit to make all of the power stage circuits in the multiphase converter evenly provide currents for driving the load.

For further understanding of the present disclosure, reference is made to the following detailed description illustrating the embodiments of the present disclosure. The description is only for illustrating the present disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF EXEMPLARY EMBODIMENTS

The aforementioned illustrations and following detailed descriptions are exemplary for the purpose of further explaining the scope of the present disclosure. Other objectives and advantages related to the present disclosure will be illustrated in the subsequent descriptions and appended drawings. In these drawings, like references indicate similar elements.

There are a plurality of embodiments provided in the following description for illustrating the current balance circuit and the multiphase converter of the present disclosure. The current balance circuit provided by the present disclosure balances currents provided by all power stage circuits in the multiphase converter by an improved DCR current detection circuit using an inductor.

[One Embodiment of the Current Balance Circuit]

Figure 1:
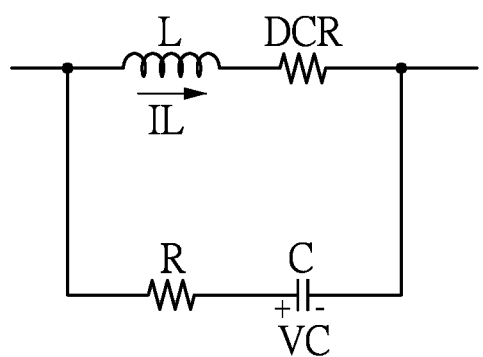
FIG. 1 shows a schematic diagram of a traditional DCR current detection circuit.
Figure 2:
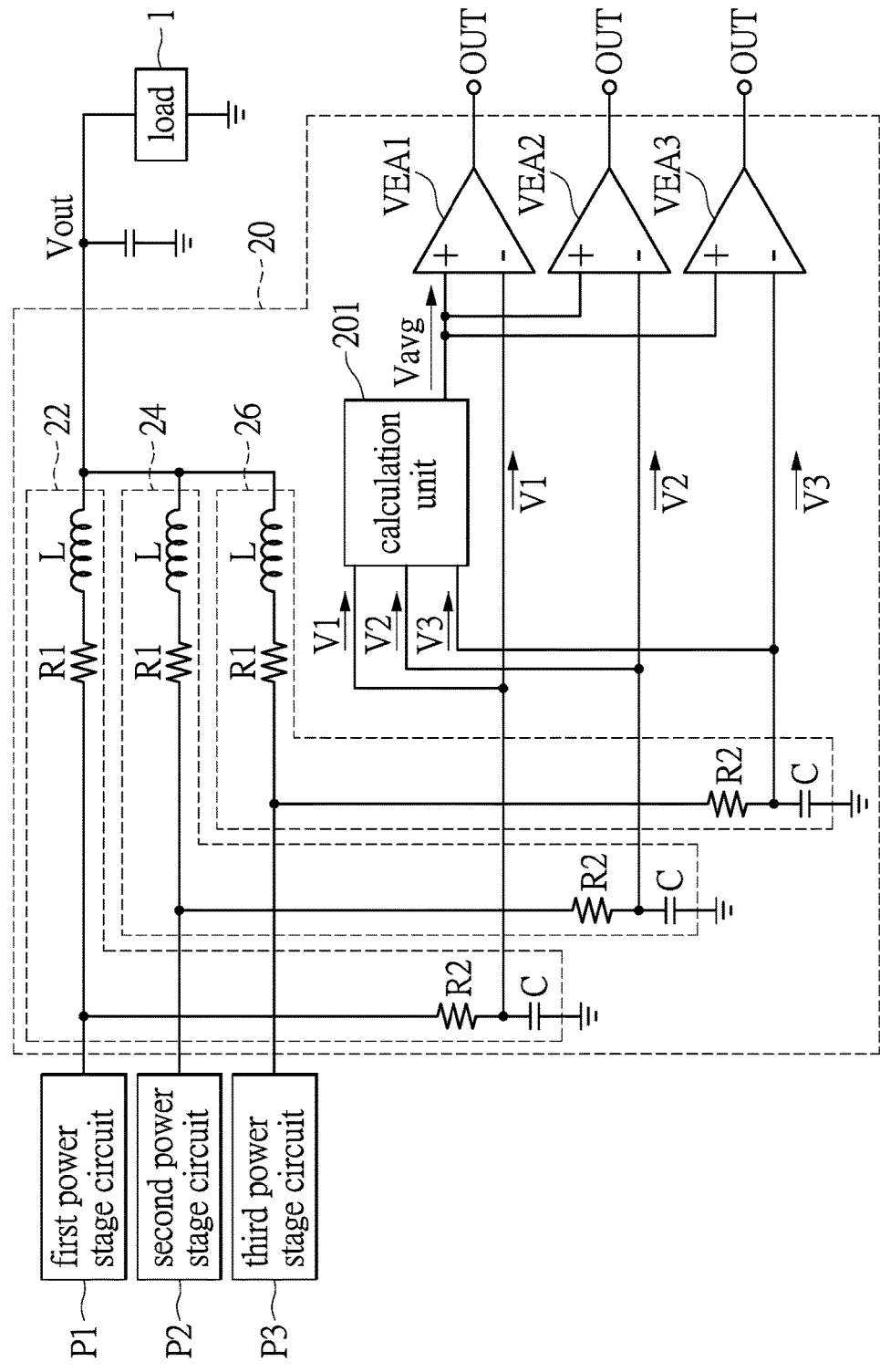
FIG. 2 shows a circuit diagram of a current balance circuit according to one embodiment of the present disclosure.

Referring to FIG. 2, a circuit diagram of a current balance circuit according to one embodiment of the present disclosure is shown. A current balance circuit 20 is mainly used in a multiphase converter to make all of the power stage circuits in the multiphase converter evenly provide currents for driving a load. In addition to the current balance circuit 20, the multiphase converter further includes a plurality of power stage circuits and a control circuit (not shown in FIG. 2). For ease of illustration, the first power stage circuit P1, the second power stage circuit P2 and the third power stage circuit P3 are taken as examples of the power stage circuits in this embodiment; however, the number of the power stage circuits is not thus restricted. In the multiphase converter, the first power stage circuit P1, the second power stage circuit P2 and the third power stage circuit P3 are electrically connected to the current balance circuit 20, and the control circuit is electrically connected between the current balance circuit 20, and the first power stage circuit P1, the second power stage circuit P2 and the third power stage circuit P3.

As shown in FIG. 2, the current balance circuit 20 includes a plurality of detection units 22, 24 and 26, a calculation circuit 201 and a plurality of error amplifiers VEA1~VEA3. The detection units 22, 24 and 26 are electrically connected to, respectively, the first power stage circuit P1, the second power stage circuit P2 and the third power stage circuit P3 to obtain the output power information V1 of the first power stage circuit P1, the output power information V2 of the second power stage circuit P2 and the output power information V3 of the third power stage circuit P3. The calculation circuit 201 is electrically connected to the detection units 22, 24 and 26 to calculate an average of the output power information V1~V3. In addition, the non-inverting input end of each of the error amplifiers VEA1~VEA3 is electrically connected to the calculation circuit 201 to receive the average of the output power information V1~V3. The inverting input ends of the error amplifiers VEA1~VEA3 are electrically connected to, respectively, the detection units 22, 24 and 26 to obtain the output power information V1 of the power stage circuit P1, the output power information V2 of the second power stage circuit P2 and output power information V3 of the third power stage circuit P3. The output ends of the error amplifiers VEA1~VEA3 are electrically connected to the control circuit.

In a traditional DCR current detection circuit, a current-detecting resistor and a capacitor are serially connected. In addition, the current-detecting resistor and the capacitor are further connected to an inductor and a direct current resistor which are serially connected in parallel. In this manner, after the resistance of the current-detecting resistor and the capacitance of the capacitor are adjusted to make the time constant corresponding to the current-detecting resistor and the capacitor match with the time constant corresponding to the inductor and the direct current resistor, a current flowing through the inductor, which is the current information of the inductor, can be detected by measuring the voltage between two ends of the capacitor.

As mentioned, the current balance circuit provided by the present disclosure balances currents provided by all power stage circuits in the multiphase converter by an improved DCR current detection circuit using an inductor. The differences between the traditional DCR current detection circuit and the detection units 22, 24 and 26 of the current balance circuit 20 of the present disclosure are illustrated in the following description.

In this embodiment, each of the detection units 22, 24 and 26 includes a first resistor R1, a second resistor R2, a capacitor C and an inductor L. As shown by the detection unit 22 electrically connected to the first power stage P1 in FIG. 2, one end of the first resistor R1 is connected to the output end of the first power stage P1 and the other end of the first resistor R1 is connected to one end of the inductor L. In addition, one end of the second resistor R2 is connected between the first resistor R1 and the output end of the first power stage P1, the other end of the second resistor R2 is connected to one end of the capacitor C, and the other end of the capacitor C is grounded. Moreover, the other end of the inductor L is connected to the output end of the multiphase converter to transmit the power provided by the first power stage circuit P1 to a load 1.

Thus, different from the traditional DCR current detection circuit, in the detection units 22, 24 and 26 of the current balance circuit 20 of the present disclosure, the serially connected second resistor R2 and the capacitor C are not connected to the serially connected first resistor R1 and the inductor L in parallel, but are directly connected between the output end of the first power stage circuit P1 and the ground.

For example, when a square signal having the current information of the inductor L is detected at the output end of the first power stage circuit P1, a small signal having the output voltage information of the first power stage circuit P1 can be extracted by the second resistor R2 and the capacitor C. Thus, the calculation circuit 201 between the second resistor R2 and the capacitor C of each of the detection units 22, 24 and 26 can obtain the small signals having the output voltage information of the first, second and third power stage circuits P1, P2 and P3, which are the output power information V1, V2 and V3. Then, the calculation circuit 201 calculates an average Vavg of the output power information V1, V2 and V3. In addition, the inverting input ends of the error amplifiers VEA1~VEA3 are connected between the second resistor R2 and the capacitor C of the detection units 22, 24 and 26 respectively, in order to obtain the output power information V1 of the first power stage circuit P1, the output power information V2 of the second power stage circuit P2 or the output power information V3 of the third power stage circuit P3.

The error amplifiers VEA1~VEA3 can obtain the average Vavg of the output power information V1~V3 of the first, second and third power stage circuits P1~P3 via their non-inverting input ends, and can obtain the output power information V1, the output power information V2 and the output power information V3 respectively via their inverting input ends. After that, the error amplifiers VEA1~VEA3 calculate differences between the average Vavg of the output power information V1~V3 and the output power information V1~V3. These differences show whether the voltages provided by the first, second and third power stage circuits P1, P2 and P3 are larger than, equal to or less than an average of the voltages provided by the first, second and third power stage circuits P1, P2 and P3. Then, the error amplifiers VEA1~VEA3 amplify these differences and convert them to current information. Finally, the control circuit adjusts and balances the currents provided by the first, second and third power stage circuits P1, P2 and P3 according to the current information.

Therefore, in this embodiment, the reason why the serially connected second resistor R2 and the capacitor C are not connected to the serially connected first resistor R1 and the inductor L in parallel but are directly connected between the output end of the first power stage circuit P1 and the ground is that, in this embodiment, it is not necessary to measure the actual voltages provided by the first, second and third power stage circuits P1, P2 and P3 to a load 1. The control circuit can adjust and balance the currents provided by the first, second and third power stage circuits P1, P2 and P3 only according to whether the voltages provided by first, second and third the power stage circuits P1, P2 and P3 are larger than, equal to or less than the average of the voltages provided by the first, second and third power stage circuits P1, P2 and P3.

The control circuit includes a plurality of PWM (Pulse Width Modulation; PWM) circuits and a plurality of drivers. According to the current information obtained from the error amplifiers VEA1~VEA3, each of the PWM circuits generates a PWN signal to its corresponding driver such that the drivers adjust the currents provided by the first, second and third power stage circuit P1~P3, so that the currents provided by the first, second and third power stage circuit P1~P3 can be balanced.

In this embodiment, the adjustments made by the control circuit to the currents provided by the first, second and third power stage circuits P1~P3 can be considered a negative feedback mechanism. The common types of the negative feedback mechanism, for example, are the Constant On-Time mechanism, the Current Mode Control mechanism and the Voltage Mode Control mechanism.

Figure 5:
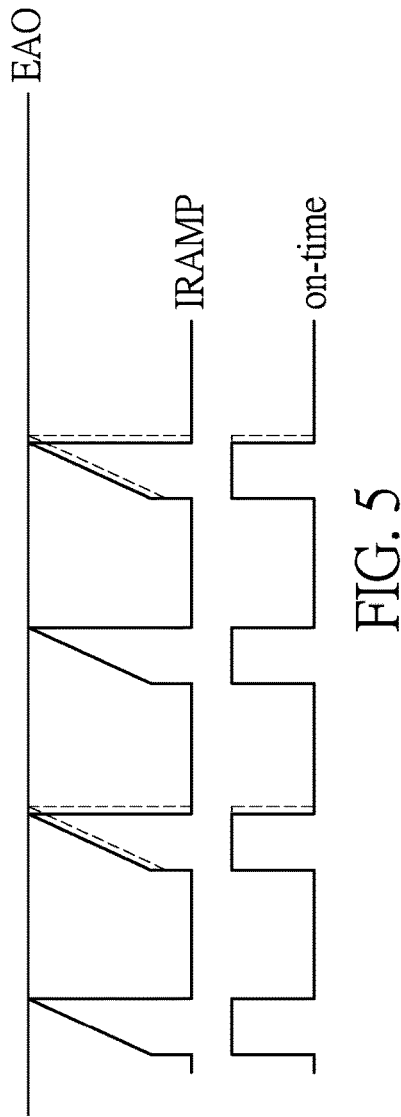
FIG. 5 is a schematic diagram showing a reference circuit signal, a compensation signal received by an error amplifier of a PWM circuit and a constant on-time of the PWM circuit according to one embodiment of the present disclosure.

FIG. 5 shows a reference circuit signal, a compensation signal received by an error amplifier in a PWM circuit and a constant on-time of the PWM circuit according to one embodiment of the present disclosure. In the Constant On-Time mechanism, when the current information from the error amplifier VEA1 indicates that the inductor current flowing through the conductor L of the detection unit 22 is larger than the average of the inductor currents flowing through the conductors L of the detection units 22, 24 and 26, the control circuit lowers the reference current signal IRAMP. As shown in FIG. 5, the time duration when the reference current signal TRAMP is smaller than the compensation signal EAO is extended because the control circuit lowers the reference current signal IRAMP. Thus, by lowering the reference current signal TRAMP, the on-time of the driver of the second or the third power stage circuit P2 or P3 can be increased, and the inductor current flowing through the inductor L of the detection unit 24 or 26 can be increased. As a result, the inductor currents flowing through the inductors L of the detection units 22, 24 and 26 are balanced.

Figure 6:
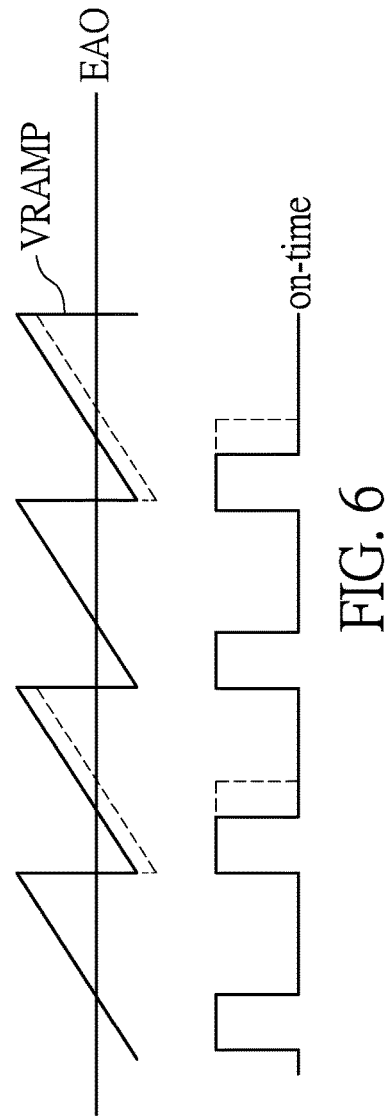
FIG. 6 is a schematic diagram showing a reference voltage signal, a compensation signal received by an error amplifier of a PWM circuit and a constant on-time of the PWM circuit according to one embodiment of the present disclosure.

FIG. 6 shows a reference voltage signal, a compensation signal received by an error amplifier in a PWM circuit and a constant on-time of the PWM circuit according to one embodiment of the present disclosure. In the Voltage Mode Control mechanism, when the current information from the error amplifier VEA1 indicates that the inductor current flowing through the inductor L of the detection unit 22 is larger than the average of the inductor currents flowing through the conductors L of the detection units 22, 24 and 26, the control circuit lowers the reference voltage signal VRAMP. As shown in FIG. 6, the time duration when the reference voltage signal VRAMP is smaller than the compensation signal EAO is extended because the control circuit lowers the reference voltage signal VRAMP. Thus, by lowering the reference voltage signal VRAMP, the on-time of the driver of the second or the third power stage circuit P2 or P3 can be increased, and the inductor current flowing through the inductor L of the detection unit 24 or 26 can be increased. As a result, the inductor currents flowing through the inductors L of the detection units 22, 24 and 26 are balanced.

In the Constant On-Time mechanism, when the current information from the error amplifier VEA1 indicates that the inductor current flowing through the inductor L of the detection unit 22 is larger than the average of the inductor currents flowing through the conductors L of the detection units 22, 24 and 26, the control circuit increases the constant on-time of the driver of the second or the third power stage circuit P2 or P3. Consequently, the constant on-time of the driver of the second or the third power stage circuit P2 or P3 increases, and the inductor current flowing through the inductor L of the detection unit 24 or 26 increases. In this manner, the inductor currents flowing through the inductors L of the detection units 22, 24 and 26 are balanced.

In the Constant On-Time mechanism, the control circuit can have different kinds of circuit structures. For example, the control circuit can be configured according to the circuit structure shown in FIG. 7A. By using the control circuit shown in FIG. 7A, the constant on-time of the driver of the second power stage circuit P2 or the third power stage circuit P3 can be directly increased.

Figure 7A:
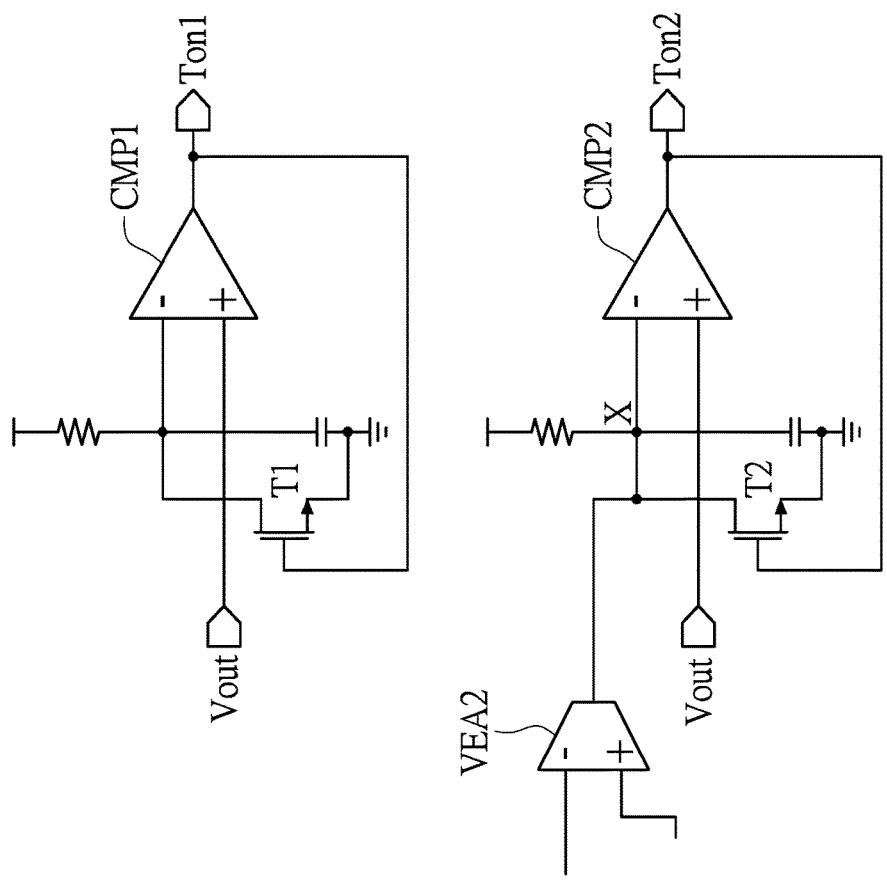
FIG. 7A and FIG. 7B show circuit diagrams of control circuits according to embodiments of the present disclosure.

As shown in FIG. 7A, the control circuit includes a first control circuit and a second control circuit. The first control circuit includes a first comparator CMP1 and a first driver (not shown), and the second control circuit includes a second comparator CMP2 and a second driver (not shown). The first driver is configured to drive one of the first, second and third power stage circuits P1, P2 and P3. The non-inverting input end of the first comparator CMP1 is coupled to the output end Vout of the multiphase converter, and the inverting input end of the first comparator CMP1 is coupled to the output end of the first comparator CMP1 through a transistor T1. The first comparator CMP1 is configured to generate a constant on-time control signal Ton1 for controlling the constant on-time of the first driver. The second driver is configured to drive one of the other power stage circuits. The non-inverting input end of the second comparator CMP2 is coupled to the output end Vout of the multiphase converter. The inverting input end of the second comparator CMP2 is coupled to the output end of the error amplifier corresponding to the power stage circuit driven by the second driver, and is also coupled to the output end of the second comparator CMP2 through a transistor T2. The second comparator CMP2 is configured to generate another constant on-time control signal Ton2 for controlling the constant on-time of the second driver.

Specifically, in FIG. 7A, when the inductor current flowing through the inductor L of the detection unit 22 is larger than the average of the inductor currents flowing through the conductors L of the detection units 22, 24 and 26, the error amplifier VEA2 or the error amplifier VEA3 extracts a current from the node X. As a result, the constant on-time of the driver of the power stage circuit P1 remains, but the constant on-time of the driver of the second power stage circuit P2 or the third power stage circuit P3 increases.

Figure 7B:
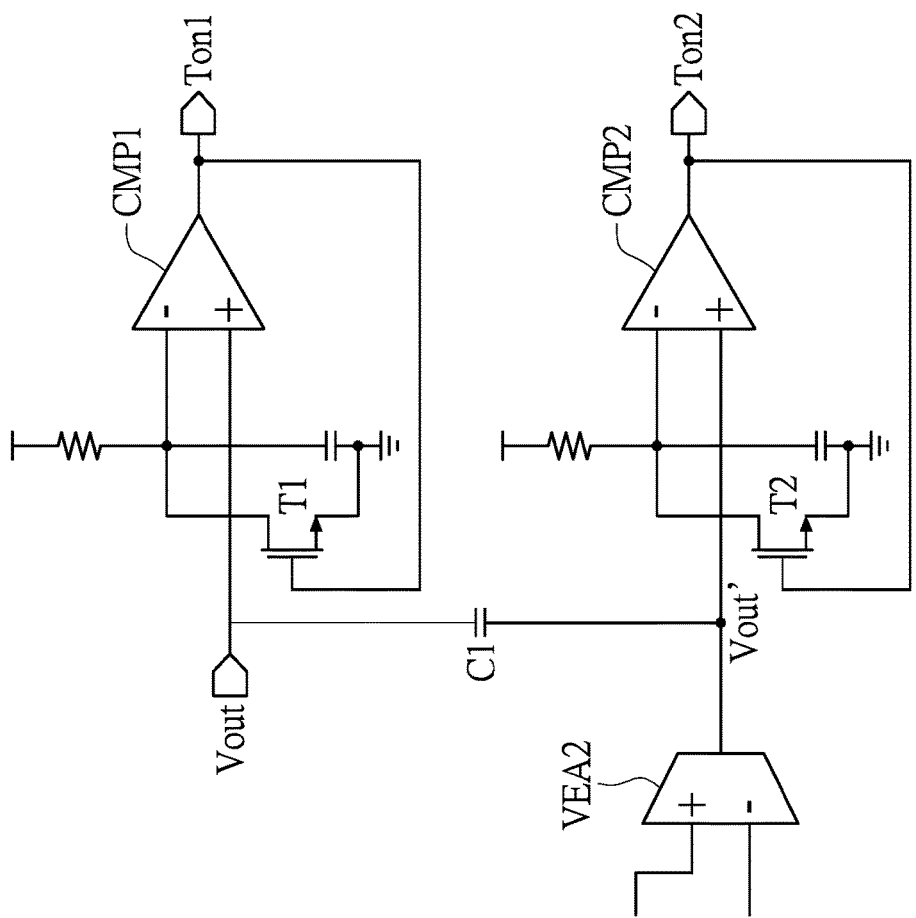

The control circuit can be also configured according to the circuit structure shown in FIG. 7B. By using the control circuit shown in FIG. 7B, the constant on-time of the driver of the second power stage circuit P2 or the third power stage circuit P3 can be directly increased, too.

As shown in FIG. 7B, the control circuit includes a first control circuit and a second control circuit. The first control circuit includes a first comparator CMP1 and a first driver (not shown), and the second control circuit includes a second comparator CMP2 and a second driver (not shown). The first driver is configured to drive one of the first, second and third power stage circuits P1, P2 and P3. The non-inverting input end of the first comparator CMP1 is coupled to the output end Vout of the multiphase converter, and the inverting input end of the first comparator CMP1 is coupled to the output end of the first comparator CMP1 through a transistor T1. The first comparator CMP1 is configured to generate a constant on-time control signal Ton1 for controlling the constant on-time of the first driver. The second driver is configured to drive one of the other power stage circuits. The non-inverting input end of the second comparator CMP2 is coupled to the output end Vout of the multiphase converter. The inverting input end of the second comparator CMP2 is coupled to the output end of the second comparator CMP2 through a transistor T2. The second comparator CMP2 is configured to generate another constant on-time control signal Ton2 for controlling the constant on-time of the second driver. Additionally, the non-inverting input end of the first comparator CMP1 and the non-inverting input end of the second comparator CMP2 are coupled together through a capacitor C1.

Specifically, in FIG. 7B, when the inductor current flowing through the inductor L of the detection unit 22 is larger than the average of the inductor currents flowing through the conductors L of the detection units 22, 24 and 26, the error amplifier VEA2 or the error amplifier VEA3 provides a current to the node Vout'. As a result, the constant on-time of the driver of the power stage circuit P1 remains, but the constant on-time of the driver of the second power stage circuit P2 or the third power stage circuit P3 increases.

It should be noted that, the skilled in the art should be familiar with the mentioned three types of the negative feedback mechanisms, and thus they are only briefly described in the above description.

[Another Embodiment of the Current Balance Circuit]

Figure 3:
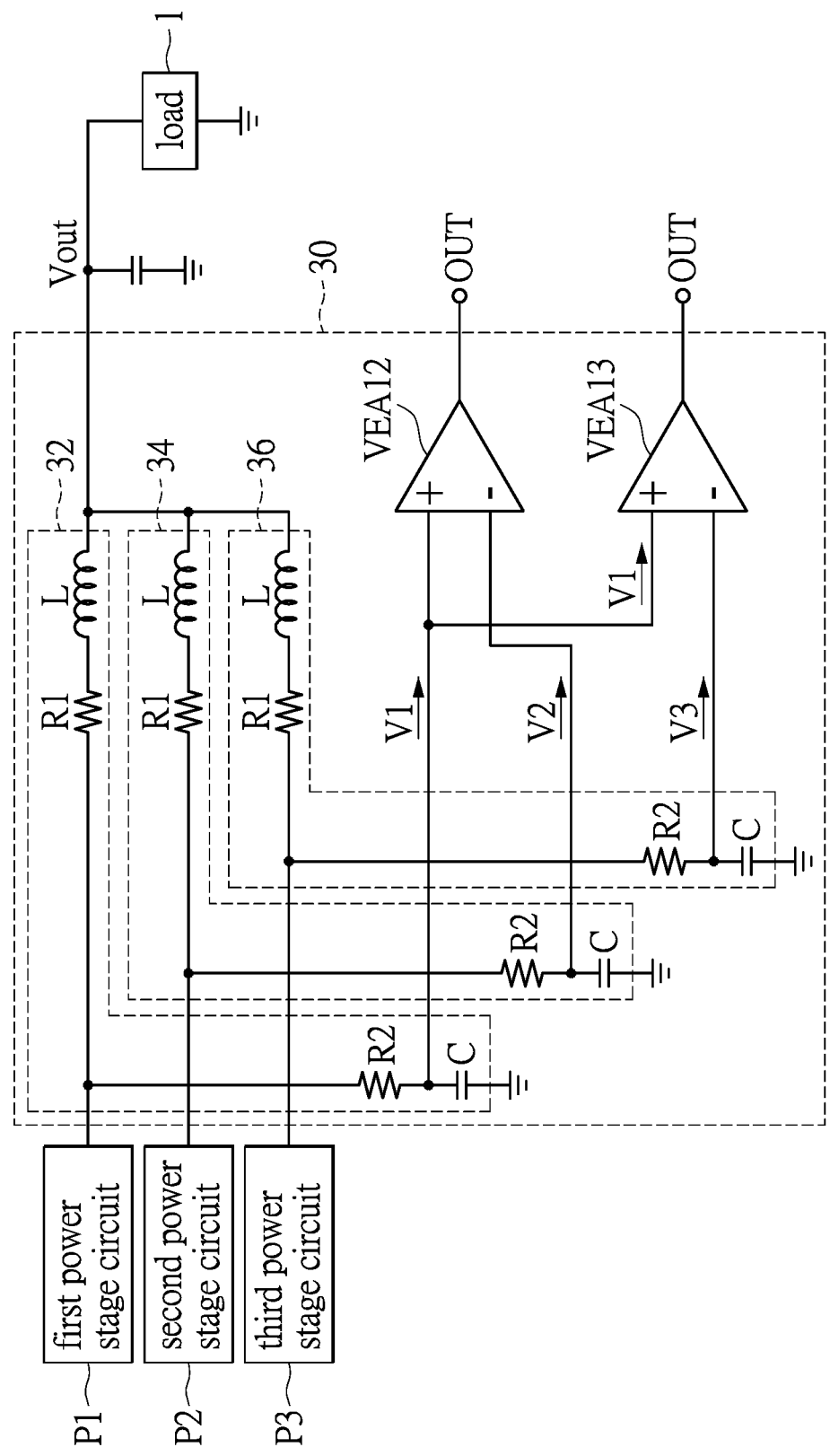
FIG. 3 shows a circuit diagram of a current balance circuit according to another embodiment of the present disclosure.

Referring to FIG. 3, a circuit diagram of a current balance circuit according to another embodiment of the present disclosure is shown. The current balance circuit 30 is also used in a multiphase converter to make all of the power stage circuits in the multiphase converter evenly provide currents for driving a load. In addition to the current balance circuit 30, the multiphase converter further includes a first power stage circuit P1, a second power stage circuit P2, a third power stage circuit P3 and a control circuit (not shown in FIG. 3). In the multiphase converter, the first power stage circuit P1, the second power stage circuit P2, the third power stage circuit P3 are electrically connected to the current balance circuit 30, and the control circuit is electrically connected between the current balance circuit 30, and the first power stage circuit P1, the second power stage circuit P2 and the third power stage circuit P3.

The circuit structure of the current balance circuit 30 in this embodiment is similar to the circuit structure of the current balance circuit 20 in the former embodiment. The difference between the current balance circuit 20 and the current balance circuit 30 is that, the current balance circuit 30 has no calculation circuit but only has a plurality of detection units 32, 34 and 36 and a plurality of error amplifiers VEA12 and VEA13.

As shown in FIG. 3, the detection unit 32 is coupled to the first power stage circuit P1 to obtain the output power information V1 of the first power stage circuit P1, the detection unit 34 is coupled to the second power stage circuit P2 to obtain the output power information V2 of the second power stage circuit P2, and the detection unit 36 is coupled to the third power stage circuit P3 to obtain the output power information V3 of the third power stage circuit P3. The non-inverting input ends of the error amplifier VEA12 and the error amplifier VEA13 are coupled to the detection unit 32 of the first power stage circuit P1 to obtain the output power information of the first power stage circuit P1. The inverting input end of the error amplifier VEA12 is coupled to the detection unit 34 of the second power stage circuit P2 to obtain the output power information V2 of the second power stage circuit P2. The inverting input end of the error amplifier VEA13 is coupled to the detection unit 36 of the third power stage circuit P3 to obtain the output power information V3 of the third power stage circuit P3. Additionally, the output end of the error amplifier VEA12 and the output end of the error amplifier VEA13 are both electrically connected to the control circuit.

The error amplifier VEA12 amplifies and converts a difference between the output power information V2 of the second power stage circuit P2 and the output power information V1 and the first power stage circuit P1 to current information. Similarly, the error amplifier VEA13 amplifies and converts a difference between the output power information V3 of the third power stage circuit P3 and the output power information V1 and the first power stage circuit P1 to current information. The current information from the error amplifier VEA12 and the current information from the error amplifier VEA13 show whether the voltages provided by the second power stage circuit P2 and the third power stage circuit P3 are larger than, equal to or less than the voltage provided by the first power stage circuit P1. To make all of the first power stage circuit P1, the second power stage circuit P2 and the third power stage circuit P3 in the multiphase converter evenly provide currents for driving a load 1, the control circuit adjusts the current provided by the second power stage circuit P2 and the current provided by the third power stage circuit P3 according to the current information from the error amplifier VEA12 and the current information from the error amplifier VEA13. As a result, the currents provided by the first power stage circuit P1, the second power stage circuit P2 and the third power stage circuit P3 can be balanced.

In the current balance circuit 20 of the former embodiment, the error amplifiers VEA1~VEA3 amplify the differences between the average Vavg of the output power information V1, V2 and V3, and the output power information V1, the output power information V2 and the output power information V3, and convert these differences to current information such that the control circuit can adjust the currents provided by the first, second and third power stage circuits P1~P3 according to the current information. Differently, in the current balance circuit 30, the error amplifier VEA12 amplifies the difference between the output power information V2 of the second power stage circuit P2 and output power information V1 of the first power stage circuit P1 and the error amplifier VEA13 amplifies the difference between the output power information V3 of the third power stage circuit P3 and output power information V1 of the first power stage circuit P1. Then, the error amplifiers VEA12 and VEA13 convert the differences to current information such that the control circuit can adjust the current provided by the second power stage circuit P2 and the current provided by the third power stage circuit P3 according to these current information.

The current balance circuit 30 also balances currents provided by the first, second and third power stage circuits P1~P3 in the multiphase converter by an improved DCR current detection circuit using an inductor.

In FIG. 3, each of the detection units 32, 34 and 36 of the current balance circuit 30 includes a first resistor R1, a second resistor R2, an inductor and a capacitor C. One end of the first resistor R1 of the detection unit 32 is coupled to the first power stage circuit P1, and the other end of the first resistor R1 of the detection unit 32 is coupled to one end of the inductor L of the detection unit 32. One end of the first resistor R1 of the detection unit 34 is coupled to the second power stage circuit P2, and the other end of the first resistor R1 of the detection unit 34 is coupled to one end of the inductor L of the detection unit 34. One end of the first resistor R1 of the detection unit 36 is coupled to the third power stage circuit P3, and the other end of the first resistor R1 of the detection unit 36 is coupled to one end of the inductor L of the detection unit 36. One end of the second resistor R2 of the detection unit 32 is coupled between the first resistor R1 and the first power stage circuit P1, the other end of the second resistor R2 of the detection unit 32 is coupled to one end of the capacitor C of the detection unit 32, and the other end of the capacitor C of the detection unit 32 is grounded. One end of the second resistor R2 of the detection unit 34 is coupled between the first resistor R1 and the second power stage circuit P2, the other end of the second resistor R2 of the detection unit 34 is coupled to one end of the capacitor C of the detection unit 34, and the other end of the capacitor C of the detection unit 34 is grounded. One end of the second resistor R2 of the detection unit 36 is coupled between the first resistor R1 and the third power stage circuit P3, the other end of the second resistor R2 of the detection unit 36 is coupled to one end of the capacitor C of the detection unit 36, and the other end of the capacitor C of the detection unit 36 is grounded. Additionally, in each of the detection units 32, 34 and 36, the other end of the inductor L is coupled to the output end Vout of the multiphase converter to transmit power outputted from the first power stage circuit P1, the second power stage circuit P2 and the third power stage circuit P3 for driving the load 1.

Similar to the current balance circuit 20 shown in FIG. 2, in each of the detection units 32, 34 and 36 of the current balance circuit 30, the serially connected second resistor R2 and the capacitor C are directly coupled between the inductor L and the output end of the first power stage circuit P1, the second power stage circuit P2 or the third power stage circuit P3, instead of being connected to the serially connected first resistor R1 and the inductor L which are connected in parallel.

The non-inverting input end of the error amplifier VEA12 and the non-inverting input end of the error amplifier VEA13 are coupled between the second resistor R2 and the capacitor C of the detection unit 32 of the first power stage circuit P1 to obtain the output power information V1 of the first power stage circuit P1. In addition, the inverting input end of the error amplifier VEA12 is coupled between the second resistor R2 and the capacitor C of the detection unit 34 of the second power stage circuit P2 to obtain the output power information V2 of the second power stage circuit P2, and the inverting input end of the error amplifier VEA13 is coupled between the second resistor R2 and the capacitor C of the detection unit 36 of the third power stage circuit P3 to obtain the output power information V3 of the third power stage circuit P3. It should be noted that, the output power information V1~V3 are voltages.

Therefore, for each of the detection units 32, 34 and 36 in this embodiment, the reason why the serially connected second resistor R2 and the capacitor C are not connected to the serially connected first resistor R1 and the inductor L in parallel but are directly connected between the output end of each of the first, second and third power stage circuits P1~P3 and the ground is that it is not necessary to measure the actual voltages provided by the power stage circuits to a load 1, and that the control circuit can adjust the currents provided by the power stage circuits only according to whether the voltage provided by the second power stage circuit P2 or the third power stage circuit P3 is larger than, equal to or less than the voltage provided by the first power stage circuit P1.

Moreover, in this embodiment, the control circuit at least includes a plurality of PWM circuits and a plurality of drivers. The PWM circuits generate PWM signals respectively according to the current information from the error amplifier VEA12 and the current information from the error amplifier VEA13, and transmit the PWM signals to their corresponding drivers. Then, according to the received PWM signal, each driver adjusts the current provided by its corresponding power stage circuit. In this manner, the currents provided by the second power stage circuit P2 and the third power stage circuit P3 can be balanced.

It is worth mentioning that, in this embodiment, the current provided by the first power stage circuit P1 is controlled by the control circuit according to a system voltage which is the output voltage of the multiphase converter. For example, a comparator (not shown) compares the detected system voltage and a predetermined reference voltage. Then, it can be known whether the system voltage is larger than the predetermined reference voltage after the currents provided by the second power stage circuit P2 and the third power stage circuit P3 are adjusted (increased or decreased). When the system voltage is larger than the predetermined reference voltage, the control circuit decreases the current provided by the first power stage circuit P1 to assure that the multiphase converter can work normally.

Additionally, the common types of the negative feedback mechanism of the control circuit are similar to the control circuit of the current balance circuit provided by the former embodiment.

[One Embodiment of the Multiphase Converter]

Figure 4:
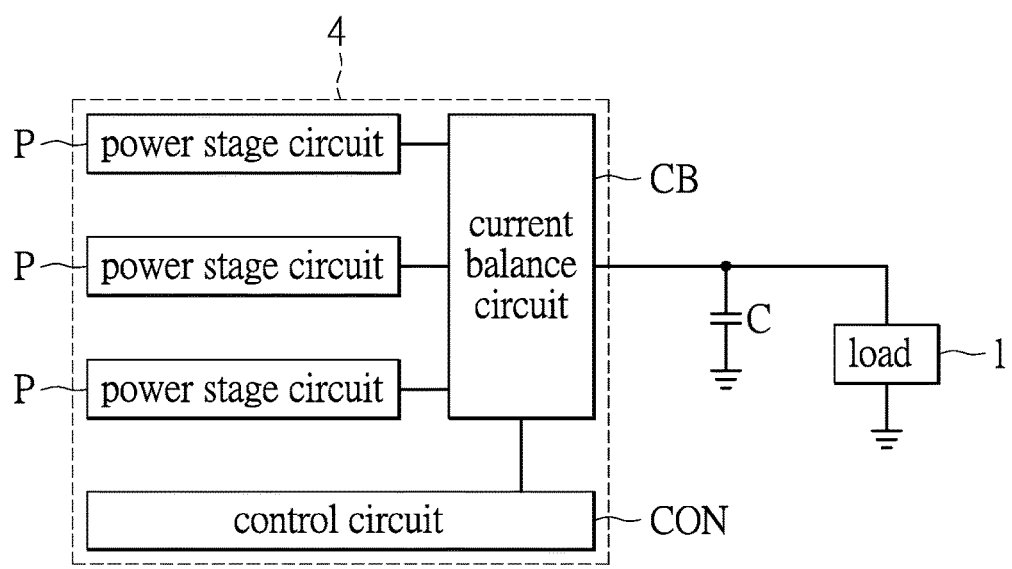
FIG. 4 shows a block diagram of a multiphase converter according to one embodiment of the present disclosure.

Referring to FIG. 4, a block diagram of a multiphase converter according to one embodiment of the present disclosure is shown. The multiphase converter 4 provided by this embodiment at least includes a plurality of power stage circuits P, a current balance circuit CB and a control circuit CON. Particularly, in this embodiment, in order to effectively balance the currents provided by the power stage circuits P of the multiphase converter 4, the current balance circuit CB can be any one of the current balance circuit 20 and the current balance circuit 30 illustrated in the above embodiments.

To sum up, the current balance circuit provided by the present disclosure balances currents provided by all power stage circuits in a multiphase converter by an improved DCR current detection circuit using an inductor. Compared with a general current balance circuit balancing currents provided by all power stage circuits in a multiphase converter by a traditional DCR current detection circuit, it is unnecessary for the current balance circuit provided by the present disclosure to measure the actual voltages provided by the power stage circuits to a load for balancing the currents provided by all power stage circuits. Instead, only according to the voltage differences among the voltages provided by the power stage circuits, the current balance circuit provided by the present disclosure can adjust the current provided by each power stage circuit to make all of the power stage circuits in the multiphase converter evenly provide currents for driving the load.

The descriptions illustrated supra set forth simply the preferred embodiments of the present disclosure; however, the characteristics of the present disclosure are by no means restricted thereto. All changes, alterations, or modifications conveniently considered by those skilled in the art are deemed to be encompassed within the scope of the present disclosure delineated by the following claims.

What is claimed is:

1. A current balance circuit, used in a multiphase converter, wherein the multiphase converter at least includes a plurality of power stage circuits, the current balance circuit and a control circuit, the power stage circuits are electrically connected to the current balance circuit, and the control circuit is electrically connected between the current balance circuit and the power stage circuits, comprising:
   a plurality of detection units, electrically connected to the power stage circuits respectively to obtain output power information of the power stage circuits;
   a calculation circuit, electrically connected to the detection units, and calculating an average of the output power information; and
   a plurality of error amplifiers, non-inverting input ends of the error amplifiers being electrically connected to the calculation circuit to receive the average of the output power information, inverting input ends of the error amplifiers being electrically connected to the detection units respectively to receive the output power information, and output ends of the error amplifiers being electrically connected to the control circuit;
   wherein after each error amplifier compares the output power information with the average of the output power information, each error amplifier amplifies a difference between the output power information and the average of the output power information and converts the amplified difference to current information, such that the control circuit adjusts a current provided by each power stage circuit according to the current information from each error amplifier to balance the currents provided by the power stage circuits;
   wherein each detection unit includes:
   a first resistor and an inductor, one end of the first resistor being electrically connected to the power stage circuit and the other end being electrically connected to one end of the inductor; and
   a second resistor and a capacitor, one end of the second resistor being electrically connected between the first resistor and the power stage circuit, the other end of the second resistor being electrically connected to one end of the capacitor, and the other end of the capacitor being grounded;
   wherein the other end of the inductor is electrically connected to an output end of the multiphase converter to provide a power for driving a load.

2. The current balance circuit according to claim 1, wherein the calculation circuit is electrically connected between the second resistor and the capacitor of each detection unit, and after the calculation circuit obtains the output power information of each power stage circuit, the calculation circuit calculates the average of the output power information;
wherein the output power information are voltages.

3. The current balance circuit according to claim 1, wherein the inverting input end of each of the error amplifiers is connected between the second resistor and the capacitor of one of the detection units to obtain the output power information of each power stage circuit;
wherein the output power information is a voltage.

4. The current balance circuit according to claim 1, wherein the control circuit at least includes:
   a first control circuit, including a first comparator and a first driver, the first driver driving one of the power stage circuits, a non-inverting input end of the first comparator electrically connected to the output end of the multiphase converter, an inverting input end of the first comparator electrically connected to an output end of the first comparator through a transistor, and the first comparator outputting a constant on-time control signal to control a constant on-time of the first driver; and
   a second control circuit, including a second comparator and a second driver, the second driver driving one of the other power stage circuits, a non-inverting input end of the second comparator electrically connected to the output end of the multiphase converter, an inverting input end of the second comparator electrically connected to an output end of one of the error amplifiers through another transistor, and the second comparator outputting a constant on-time control signal to control a constant on-time of the second driver.

5. The current balance circuit according to claim 1, wherein the control circuit at least includes:
   a first control circuit, including a first comparator and a first driver, the first driver driving one of the power stage circuits, a non-inverting input end of the first comparator electrically connected to the output end of the multiphase converter, an inverting input end of the first comparator electrically connected to an output end of the first comparator through a transistor, and the first comparator outputting a constant on-time control signal to control a constant on-time of the first driver; and
   a second control circuit, including a second comparator and a second driver, the second driver driving one of the other power stage circuits, a non-inverting input end of the second comparator electrically connected to the output end of the multiphase converter, an inverting input end of the second comparator electrically connected to an output end of the second comparator through another transistor, and the second comparator outputting a constant on-time control signal to control a constant on-time of the first driver.

6. The current balance circuit according to claim 5, wherein the non-inverting input end of the first comparator is electrically connected to the non-inverting input end of the second comparator through a capacitor.

7. A multiphase converter, at least comprising a plurality of power stage circuits, the current balance circuit according to claim 1 and a control circuit to balance the current provided by each of the power stage circuits.

8. A current balance circuit, used in a multiphase converter, wherein the multiphase converter at least includes a first power stage circuit, a second power stage circuit, a third power stage circuit, the current balance circuit and a control circuit, the first power stage circuit, the second power stage circuit and the third power stage circuit are electrically connected to the current balance circuit through the control circuit, comprising:
 a plurality of detection units, electrically connected to the first power stage circuit, the second power stage circuit and the third power stage circuit respectively to obtain an output power information of the first power stage circuit, the second power stage circuit and the third power stage circuit; and
 a plurality of error amplifiers, non-inverting input ends of the error amplifiers electrically connected to the detection unit corresponding to the first power stage circuit to obtain the output power information of the first power stage circuit, inverting input ends of the error amplifiers electrically connected to the detection units corresponding to the second power stage circuit and the third power stage circuit respectively to obtain the output power information of the second power stage circuit and the third power stage circuit, and an output end of each error amplifier electrically connected to the control end;
 wherein the error amplifiers amplify a difference between the output power information of the second power stage circuit and the output power information of the first power stage circuit and amplify a difference between the output power information of the third power stage circuit and the output power information of the first power stage circuit, and convert the amplified differences to current information, such that the control circuit adjusts the currents provided by the first power stage circuit, the second power stage circuit and the third power stage circuit to balance the currents provided by the first power stage circuit, the second power stage circuit and the third power stage circuit
 wherein each detection unit includes:
 a first resistor and an inductor, one end of the first resistor electrically connected to the first power stage circuit, the second power stage circuit or the third power stage circuit and the other end of the first resistor electrically connected to one end of the inductor; and
 a second resistor and a capacitor, one end of the second resistor electrically connected between the first resistor and the first power stage circuit, the second power stage circuit or the third power stage circuit, the other end of the second resistor electrically connected to one end of the capacitor, and the other end of the capacitor being grounded;
 wherein the other end of the inductor is electrically connected to one output end of the multiphase converter to provide a power for driving a load.

9. The current balance circuit according to claim 8, wherein a non-inverting input end of each error amplifier is electrically connected between the second resistor of the detection unit corresponding to the first power stage circuit and the capacitor to obtain the output power information of the first power stage circuit, an non-inverting input end of each error amplifier is electrically connected between the second resistor of the detection unit corresponding to the second power stage circuit and the capacitor or between the second resistor of the detection unit corresponding to the third power stage circuit and the capacitor to obtain the output power information of the second power stage circuit or the output power information of the third power stage circuit;
 wherein the output power information is a voltage.

10. The current balance circuit according to claim 8, wherein the control circuit at least includes:
 a first control circuit, including a first comparator and a first driver, the first driver driving one of the power stage circuits, an non-inverting input end of the first comparator electrically connected to the output end of the multiphase converter, an inverting input end of the first comparator electrically connected to an output end of the first comparator through a transistor, and the first comparator outputting a constant on-time control signal to control a constant on-time of the first driver; and
 a second control circuit, including a second comparator and a second driver, the second driver driving one of the power stage circuits, an non-inverting input end of the second comparator electrically connected to the output end of the multiphase converter, an inverting input end of the second comparator electrically connected to an output end of one of the error amplifiers through a transistor, and the second comparator outputting a constant on-time control signal to control a constant on-time of the second driver.

11. The current balance circuit according to claim 8, wherein the control circuit at least includes:
 a first control circuit, including a first comparator and a first driver, the first driver driving one of the power stage circuits, a non-inverting input end of the first comparator electrically connected to the output end of the multiphase converter, an inverting input end of the first comparator electrically connected to the output end of the first comparator through a transistor, and the first comparator outputting a constant on-time control signal to con troll a constant on-time of the first driver; and
 a second control circuit, including a second comparator and a second driver, the second driver driving one of the power stage circuits, a non-inverting input end of the second comparator electrically connected to the output end of the multiphase converter, an inverting input end of the second comparator electrically connected to the output end of the second comparator through a transistor, and the second comparator outputting a constant on-time control signal to control a constant on-time of the second driver.

12. The current balance circuit according to claim 11, wherein the non-inverting input end of the first comparator is electrically connected to the non-inverting input end of the second comparator through a capacitor.

13. A multiphase converter, at least comprising a plurality of power stage circuits, the current balance circuit according to claim 8 and a control circuit to balance the current provided by each of the power stage circuits.

* * * * *